United States Patent
Bocanegra Alvarez (10) Patent No.: US 9,772,978 B2
(45) Date of Patent: Sep. 26, 2017

(54) TOUCH INPUT VISUALIZATIONS BASED ON USER INTERFACE CONTEXT

(71) Applicant: Adobe Systems Incorporated, San Jose, CA (US)

(72) Inventor: Tobias M. Bocanegra Alvarez, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 479 days.

(21) Appl. No.: 13/762,148

(22) Filed: Feb. 7, 2013

(65) Prior Publication Data

US 2014/0223281 A1   Aug. 7, 2014

(51) Int. Cl.
G06F 17/21 (2006.01)
G06Q 10/10 (2012.01)
G06F 3/0488 (2013.01)

(52) U.S. Cl.
CPC .......... G06F 17/218 (2013.01); G06F 3/0488 (2013.01); G06Q 10/103 (2013.01)

(58) Field of Classification Search
CPC ..................................................... G06Q 10/03
See application file for complete search history.

(56) References Cited

U.S. PATENT DOCUMENTS

| | | | |
|---|---|---|---|
| 8,010,901 B1* | 8/2011 | Rogers | 715/751 |
| 2009/0138830 A1* | 5/2009 | Borgaonkar et al. | 715/863 |
| 2012/0084670 A1* | 4/2012 | Momchilov | G06F 3/04883 715/753 |
| 2012/0262379 A1* | 10/2012 | King | G06F 3/1454 345/173 |
| 2014/0149946 A1* | 5/2014 | Feller | G06F 3/04886 715/863 |

* cited by examiner

*Primary Examiner* — Asher Kells
(74) *Attorney, Agent, or Firm* — Wolfe-SBMC (57) ABSTRACT

Touch input visualizations for web-based interaction are described. Script associated with a web application is configured to process information regarding touch input events and produce corresponding visualizations for touch inputs when executed at a client device. In one approach, touch input events at the client device are captured and analyzed to determine characteristics of touch input including at least locations within a user interface corresponding to the touch input. A mark-up language document that is rendered in the user interface may be modified to define visualizations for the touch input at the locations. The mark-up language document including the visualizations at the locations may then be output via the user interface. A collaboration module may be used to share the user interface including the touch visualizations to another screen, such as during a meeting or online demonstration.

20 Claims, 6 Drawing Sheets

TOUCH INPUT VISUALIZATIONS BASED ON USER INTERFACE CONTEXT

BACKGROUND

Individuals have increasing access to and make frequent use of web applications available from service providers. Generally, web applications are applications that are accessed over a network using a browser or other network-enabled client application to obtain and run client-side code for the web application. Web applications may make use of runtime support (e.g., a runtime environment) for common protocols, programming languages, and components integrated with the browser or network-enabled client application in lieu of deploying device-specific client code. This approach may simplify portability of the web applications for use with different computing platforms and architectures.

Today, browsers and other network enabled client applications may also be configured for use with touch capable devices and touch inputs. During touch based interaction, however, many devices do not display a cursor or other indicator of user actions. Thus, in settings in which a user is making a presentation, demonstrating an application, or otherwise collaborating with others via a touch capable device, it may be difficult for viewers to fully appreciate touch inputs that are involved.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

Various embodiments provide touch input visualizations for web based interaction. In one or more embodiments, script included with or otherwise associated with a web application is configured to process information regarding touch input events and produce corresponding visualizations for touch inputs when executed at a client device. In one approach, touch input events at the client device are captured and analyzed to determine characteristics of touch input including at least locations within a user interface corresponding to the touch input. A mark-up language document that is rendered in the user interface may be modified to define visualizations for the touch input at the locations. The mark-up language document including the visualizations at the locations may then be output via the user interface. In some embodiments, a collaboration module may be used to share the user interface locally or over a network to another device and the described techniques may be used to show the touch visualizations on a display associated with the other device, such as during a web meeting or demonstration.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Various embodiments provide touch input visualizations for web-based interaction. In one or more embodiments, script included with or otherwise associated with a web application is configured to process information regarding touch input events and produce corresponding visualizations for touch inputs when executed at a client device. In one approach, touch input events at the client device are captured and analyzed to determine characteristics of touch input including at least locations within a user interface corresponding to the touch input. A mark-up language document that is rendered in the user interface may be modified to define visualizations for the touch input at the locations. The mark-up language document including the visualizations at the locations may then be output via the user interface. In some embodiments, a collaboration module may be invoked to share the user interface including the touch visualizations for output via another device, locally and/or over a network.

For example, a developer may hold an online or live meeting to demonstrate a web application. To demonstrate various features and interaction scenarios using a touch capable tablet, the developer may set-up a screen sharing stream over the Internet and/or locally to replicate the display of the tablet on a presentation screen, television, remote monitor, etc. The developer may turn-on or otherwise enable touch visualizations for the demonstration using techniques described herein. When the developer provides touch input in different interaction scenarios for their web application, the web application is configured to detect the touch input and produce corresponding visualizations, substantially in real-time. The visualizations are output to replications of the tablet display locally and/or over a network. Now, viewers of the demonstration are able to see representations of the touch input used by the developer and may be able to have a better appreciation of the features of the web application that are being demonstrated.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

Figure 1:
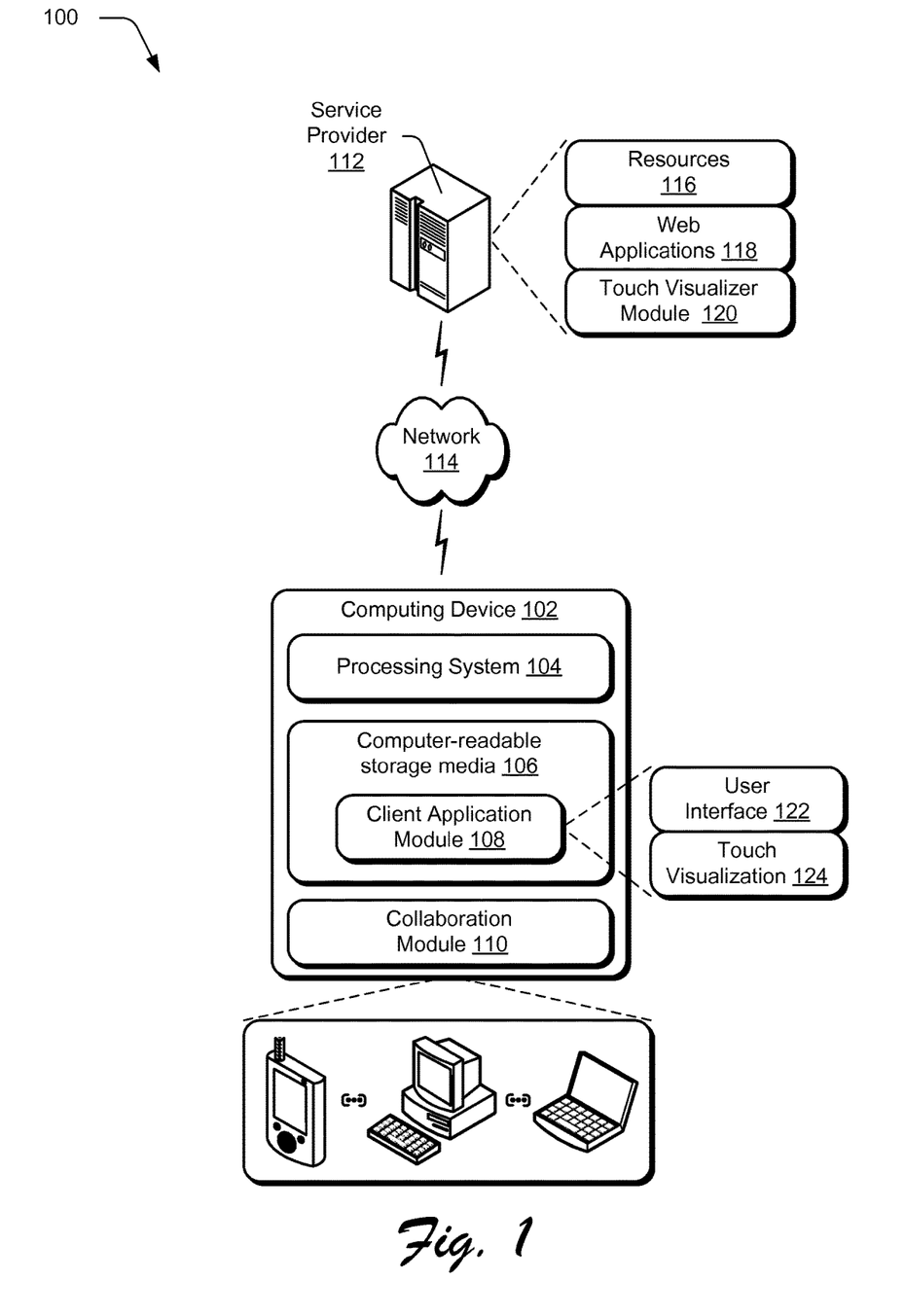
FIG. 1 is an illustration of an environment in an example implementation that is operable to employ techniques described herein.

FIG. 1 is an illustration of an environment 100 in an example implementation that is operable to employ techniques described herein. The illustrated environment 100 includes a computing device 102 including a processing system 104 that may include one or more processing devices, one or more computer-readable storage media 106 and a client application module 108 embodied on the computer-readable storage media 106 and operable via the processing system 104 to implement corresponding functionality described herein. In at least some embodiments, the client application module 108 may represent a browser of the computing device operable to access various kinds of web-based resources (e.g., content and services). The client application module 108 may also represent a client-side component having integrated functionality operable to access web-based resources (e.g., a network-enabled application), browse the Internet, interact with online providers, and so forth.

The computing device 102 may also include or make use of a collaboration module 110 that represents functionality operable to share an application user interface, device desktop, and/or other screen output for display to another device, separate and distinct from the computing device. Sharing of a screen output of the computing device 102 via a collaboration module 110 may occur both locally and over a network to one or more other devices. For instance, a user of a tablet device may employ a collaboration module 110 to stream a presentation to a projector or monitor in a conference room. In another example, the collaboration module 110 may enable an online interactive session with multiple users and accordingly a screen output from a particular user's device may be shared over a network to multiple other devices associated with collaborators in the interactive session. Techniques described herein may be employed to incorporate touch visualizations in the various screen sharing scenarios as well as in other scenarios. The collaboration module 110 may be implemented as a software module, a hardware device, or using a combination of software, hardware, firmware, fixed logic circuitry, etc. The collaboration module 110 may be implemented as a standalone component of the computing device 102 as illustrated. In addition or alternatively, the collaboration module 110 may be configured as a component of the client application module 108, an operating system, or other device application. Still further, the collaboration module 110 may represent an external or removably connectable device, such as an external streaming media device that is separate from the computing device 102 or an add-on accessory device for the computing device 102.

The computing device 102 may be configured as any suitable type of computing device. For example, the computing device may be configured as a desktop computer, a laptop computer, a mobile device (e.g., assuming a handheld configuration such as a tablet or mobile phone), a tablet, and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 6.

The environment 100 further depicts one or more service providers 112, configured to communicate with computing device 102 over a network 114, such as the Internet, to provide a "cloud-based" computing environment. Generally, speaking a service provider 112 is configured to make various resources 116 available over the network 114 to clients. In some scenarios, users may sign up for accounts that are employed to access corresponding resources from a provider. The provider may authenticate credentials of a user (e.g., username and password) before granting access to an account and corresponding resources 116. Other resources 116 may be made freely available, (e.g., without authentication or account-based access). The resources 116 can include any suitable combination of services and/or content typically made available over a network by one or more providers. Some examples of services include, but are not limited to, a photo editing service, a web development and management service, a collaboration service, a social networking service, a messaging service, an advertisement service, and so forth. Content may include various combinations of text, video, ads, audio, multi-media streams, animations, images, web documents, web pages, applications, device applications, and the like.

Web applications 118 represent one particular kind of resource 116 that may be accessible via a service provider 112. As mentioned, web applications 118 may be operated over a network 114 using a browser or other client application module 108 to obtain and run client-side code for the web application. In at least some implementations, a runtime environment for execution of the web application 118 is provided by the browser (or other client application module 108). The runtime environment supports web applications 118 that may be written using dynamic scripting languages, such as JavaScript, hypertext markup language revision 5 and cascading style sheets (HTML5/CSS), and/or extensible application mark-up language (XAML). Script-based web applications may operate through corresponding runtime environments supported by a device that are configured to provide respective execution environments for corresponding applications. The runtime environments may provide a common set of features, routines, and functions for compatible applications thereby offloading coding of common tasks from application development. Thus, the runtime environment can facilitate portability of web applications to different kinds of systems and architectures with little or no change to the script for the applications. Various types of runtime environments may be employed including but not limited to JAVA™ runtime environment (JRE) and Adobe™ Flash™, to name a few examples.

At least some web applications 118 may be configured to include or make use of a touch visualizer module 120 to implement techniques described above and below. In particular, the touch visualizer module 120 represents functionality operable in connection with touch input to produce and output touch visualizations for the touch input. The touch visualizer module 120 may implemented as script that is included with or associated with a web application 118. Briefly, the touch visualizer module 120 may operate to detect and process touch input events obtained in connection with a web application, generate corresponding visualizations, and cause the visualizations to appear in a user interface for the web application. In one approach, the touch visualizer module 120 injects script into or otherwise modifies web documents or web pages for the web application to define the visualizations in response to touch input events. The touch visualizer module 120 may be deployed as part of a web application package that is supplied to a client by the service provider 112. In addition or alternatively, the touch visualizer module 120 may be deployed separately from web applications 118 in some scenarios. For example, the touch visualizer module 120 may be provided as a browser add-on or plug-in, or as a stand-alone client application.

In operation, a browser (or other client application module 108) may be employed to access resources 116 over the network 114 from a service provider 112, including accessing one or more web applications 118. At least some of the web applications 118 may be configured to employ a touch visualizer module 120. A web application 118 may be downloaded and executed by a computing device 102 by way of the browser. The web application may include various different web documents or web pages that may be rendered by the browser. In particular, the browser may render a user interface 122 to present web documents or web pages corresponding to the web application. A user may then interact with the web documents or web pages (e.g., mark-up language documents, HTML pages, XML files, etc.) in various ways, including supplying touch input to manipulate the pages.

In connection with touch input that is supplied with respect to the web application, the touch visualizer module 120 may obtain data indicative of touch input events and process the data to ascertain locations within a rendered document/page corresponding to the input. Then, mark-up of the rendered document/page may be modified to define a touch visualization 124 at the locations for the touch input. This may involve dynamically injecting script into the document/page, producing an overlay, or otherwise defining appropriate visualizations for the touch input at the ascertained locations. The document/page may then be refreshed and/or re-rendered to output the visualizations substantially in real-time. Here, the term "real-time" is intended to indicate that the touch input and display of corresponding visualizations may appear to occur substantially simultaneously to a viewer and/or without a visually perceptible delay. Various types of touch visualizations 124 are contemplated, examples of which are described in relation to the following figures.

Having considered an example environment, consider now a discussion of some example details of the techniques for touch input visualizations in accordance with one or more implementations.

Touch Input Visualizations Details

This section describes some example details of touch input visualizations in accordance with one or more implementations. As discussed below, touch input visualization may be configured in various ways to visually represent touch input. The touch input may be provided via a touchscreen (e.g., touch digitizer) of a computing device in connection with a web application 118. Generally, the web application is configured to include or make use of functionality (e.g., a touch visualizer module 120 or comparable functionality) to process touch input events and cause display of corresponding touch visualizations. Web applications may be accessed from one or more servers of a service provider 112 and may be executed on demand via a browser. Generally, a web application is browser and platform agnostic and accordingly may be employed with different types of browsers, systems, platforms, and architectures to implement touch input visualizations in addition to providing the core functionality of the web application itself. Thus, the web application developer is relieved of the burden of producing different implementations of the application for different hardware, device, and software combinations.

Figure 2:
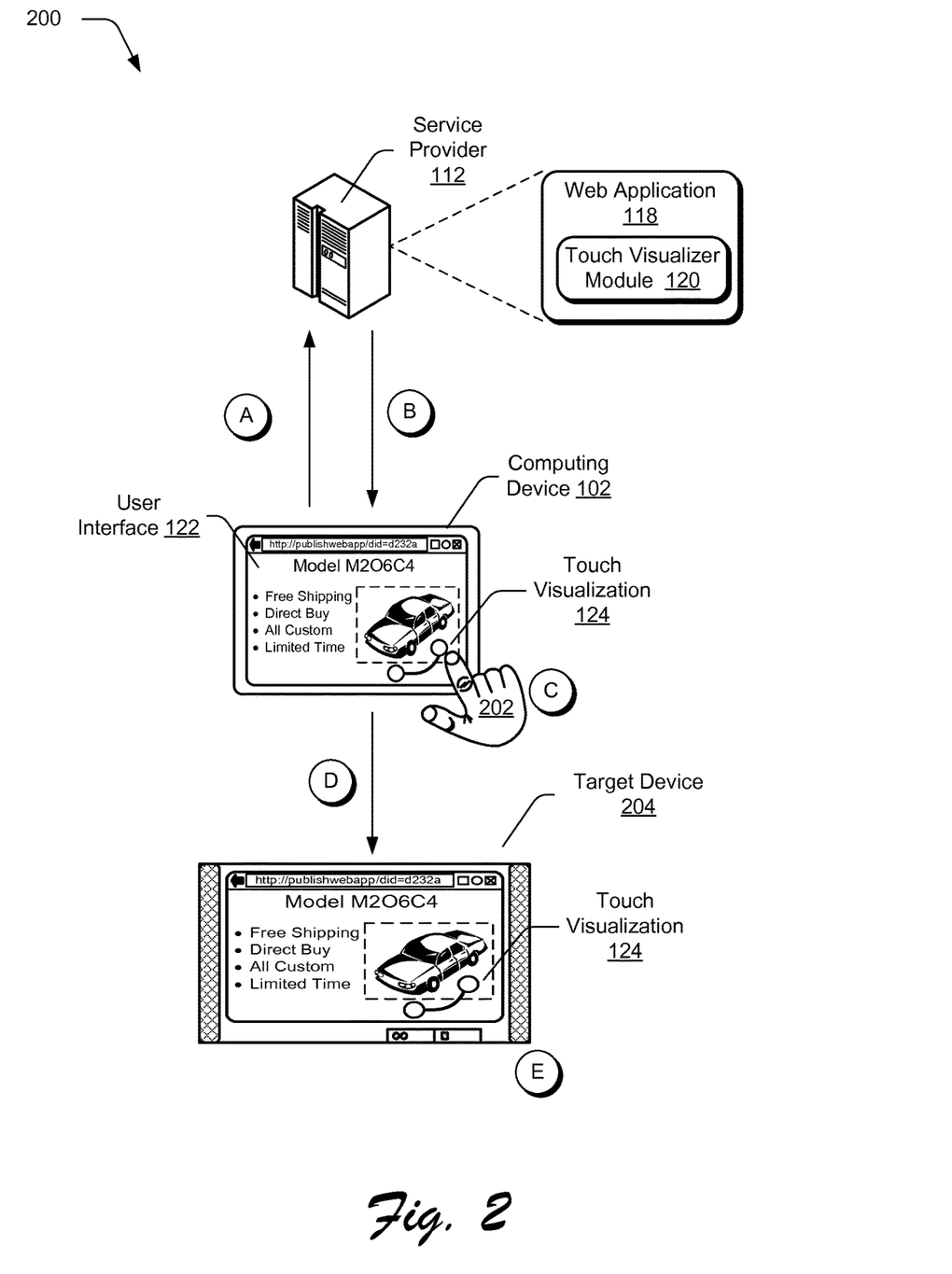
FIG. 2 illustrates a sharing scenario that makes use of touch input visualizations in accordance with one or more implementations.

To illustrate, FIG. 2 depicts generally at 200 an example sharing scenario that makes use of touch input visualizations. Here letters "A" to "E" are used to denote different example operations that may occur as part of the sharing scenario. At "A", a computing device 102 may interact with a service provider 112 to make use of a web application 118. In this example, the web application 118 includes a touch visualizer module 120, although the touch visualizer module 120 may be implemented in different ways as previously described.

At "B", the service provider 112 may supply the web application 118 over a network to the computing device 102. The web application 118 may be implemented by way of various web documents and pages that are rendered/displayed by a client application module 108 such as a browser. The documents/pages may be configured to facilitate interactions with services and content provided by the service provider 112. The computing device 102 may output the various documents/pages via a user interface 122. In the illustrated example, the web application 118 comprises a web-based publishing tool that may facilitate creation, editing, and management of web content and pages. Here, a web document to showcase a model car being offered for sale is depicted as being edited via the web-based publishing tool.

At "C", a user's hand 202 is depicted as providing touch input, which causes corresponding touch visualization 124 to appear in the user interface 122. In particular, an image of the model car is represented as being moved and positioned within the web document. This action may generate successive touch input events. Although, touch from a user's hand is depicted, touch input may also encompass input from a stylus or other implement. Moreover, the described techniques to show visualizations of inputs may be employed with other types of input, including by way of example and not limitation, input/gestures supplied via a remote control device, camera-based inputs and gestures captured via a camera, verbal commands, and so forth.

The touch visualizer module 120 may be configured as a handler for the touch input events. To do so, the touch visualizer module 120 may register upon initialization to receive touch input events from a touch controller, operating system, or other designated provider of touch input data for a device. Thus, when touch input events occur, a touch controller (or other designated provider) may supply data indicative of the touch input events to the touch visualizer module. In some cases, script-based events and objects are employed to convey data regarding touch input events in a pre-determined format that the touch visualizer module 120 is designed to recognize and handle. The data may include characteristics of the touch input events including IDs, time codes, input durations, the type of touch (e.g., press, slide, click, drag, swipe, etc.), directional information, pressure data, and locations at which touch occurs.

In some cases, raw touch data may be supplied to the touch visualizer module 120 for processing. In addition or alternatively, a touch controller, operating system, or other module may be configured to pre-process the touch data to resolve characteristics, recognize gestures (e.g., defined input combinations), create context data indicative of a context in which the input is provided (e.g., button selection, resize object, scroll, operate control, etc.), and so forth. Thus, data supplied may include pre-determined indications of particular gestures, input contexts, and/or characteristics based on the pre-processing.

The touch visualizer module 120 may make use of the supplied data to identify characteristics of the touch input and determine corresponding visualizations to associate with the touch input based on the characteristics. This may involve at least determining locations at which touch occurs and showing indicators of touch at the locations. The indicators for visualizations may be configured as basic shapes such as circles, triangles, squares, etc. A pre-selected and/or configurable indicator may be employed to show touch points at different locations.

In addition or alternatively, the same or different indicators may be used for different touch points and/or for different types of input and gestures. Further, the touch visualizer module may be configured to select different indicators and visualizations based upon combinations of characteristics, indicated gestures, and/or an input context for the touch input events. Some example visualizations that may be employed include but are not limited to a relatively simple shape to indicate a single touch, multiple different symbols/shapes/icons to show touch combinations, simple animations to show swipes and drags, and even complex animations to represent multi-touch gestures. By way of example, FIG. 2 depicts an initial touch point as a circle, a curved line that traces movement of a finger of the user's hand 202 to move and position the image, and another circle at the final touch point.

To select visualizations for particular inputs, the touch visualizer module 120 may include or otherwise make use of a visualizations database, visualization mapping file, or other visualizations library that is configured to match visualizations to particular input characteristics, input contexts, and gestures. Definitions of the visualizations used to implement the visualizations (e.g., script files, script templates, and supporting graphics/images) may also be accessible directly or indirectly via the database, mapping file, or other visualizations library. The touch visualizer module 120 may therefore be configured to reference an appropriate library/data structure to look-up, discover, and retrieve visualizations that match identified input characteristics, input contexts, and gestures.

A selected visualization may be added to a document/page in any suitable way. In one approach, mark-up for the rendered page is modified to define the selected visualization. For example, script to implement the selected visualization may be injected in to a document object model (DOM) for a page rendered by a browser. One way to do so is by using a positioning element (such as a DIV element) to designate visualizations to present at corresponding locations in the page.

For example, when a touch start event occurs, a circle or other indicator may be initialized, unhidden, and positioned at one or more touch points using positioning elements. As the touch points move, the indicators may be repositioned accordingly by updating the locations of the positioning elements. In response to a touch end event, one or more corresponding indicators may be hidden. As noted, different indicators may be used for different kinds of touch input, gestures and input contexts. This is illustrated in FIG. 2 by having one type of visualization (circles) at start and end touch points and another type of visualization (curved line) to represent movement in between. In addition or alternatively, an indicator such as the circle may appear when a user touches the device screen with their finger (or otherwise) and remain visible to track movement of the finger until the finger is lifted (e.g., input event ends). In this case, the same indicator is used for the entire interaction.

At "D", the display screen/graphics output of the computing device 102 is shared to a target device 204. The target device 204 may be a monitor or television used for presentation purposes, another user's device used for collaboration, or other separate device to which the output of the computing device 102 is replicated. This may occur by way of a collaboration module 110 that may be invoked to share a display screen/graphics output of a computing device 102 in various ways as previously described. At "E", the replicated output of the computing device 102 is displayed by the target device 204. The replicated output includes the touch visualizations 124 that are produced in response to input that occurs at "C".

Figure 3A:
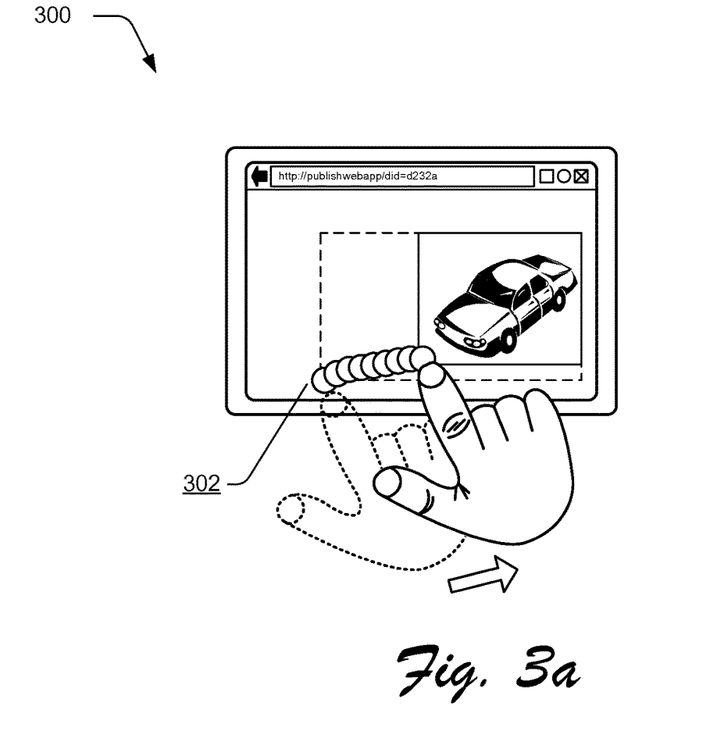
FIG. 3a illustrates an example touch visualization in accordance with one or more implementations.
Figure 3B:
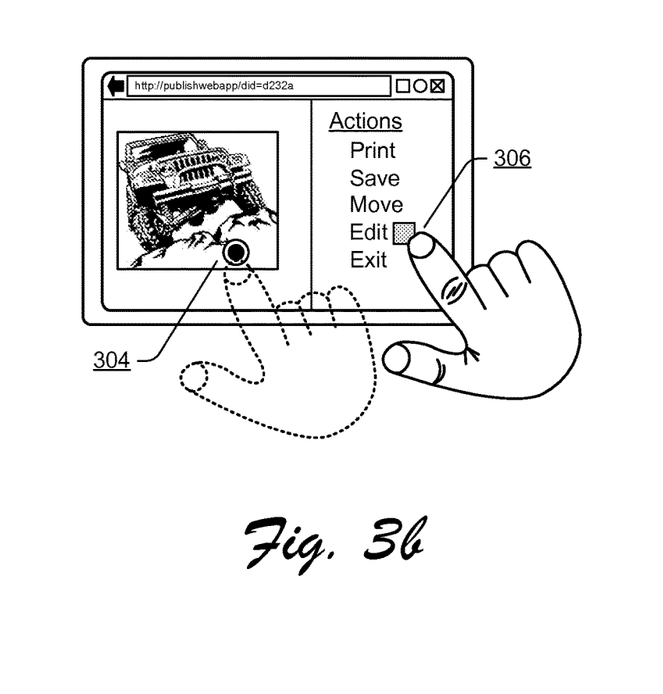
FIG. 3b illustrates another example touch visualization in accordance with one or more implementations.

FIGS. 3*a* and 3*b* illustrate generally at 300 some further example touch visualizations that may be used in one or more embodiments. In particular, FIG. 3*a* illustrates a visualization 302 in which a sequence of circles is displayed. In this example, the sequence of circles tracks movement of a user's finger as the finger is dragged across the screen to resize an image. The circles may be drawn individually at each refresh, such that just one circle appears in each frame. In another approach, each circle may have an associated dwell time, such that multiple circles may appear and disappear at different times to represent the motion of the finger across the screen. For example, a dark circle at a current location may be displayed with a tail of additional lighter or fading colored circles following it at previous locations. Thus, the circles may persist for the dwell time and then fade out to give a sense of the tracked motion. Various other visual effects and animations are also contemplated.

FIG. 3*b* illustrates visualizations 304 and 306 for successive touch at different points. In this example, the visualization 304 represents a selection of an item (e.g., the Jeep image) using a concentric circle. The concentric circle may appear briefly and then disappear, or may remain visible as long as the item remains selected to represent the continued selection. The visualization 306 represents a menu item selection (e.g., an edit action for an actions menu) using a square indicator. The different indicators for visualizations 304 and 306 are representative of the general notion that different visualizations may be associated with different types of input, characteristics, gestures, and input contexts. By using different indicators, a viewer may be able to quickly determine not only where touch inputs that are represented occur, but also the type of input that is involved (e.g., an item selection, a menu selection, a drag, a particular gesture, and so on).

Having discussed example details of the techniques for touch input visualizations, consider now some example procedures to illustrate additional aspects of touch input visualizations.

Example Procedures

This section describes example procedures for touch input visualizations in one or more implementations. Aspects of the procedures may be implemented in hardware, firmware, or software, or a combination thereof. The procedures is shown as a set of blocks that specify operations performed by one or more devices and are not necessarily limited to the orders shown for performing the operations by the respective blocks. In at least some embodiments the procedures may be performed by a suitably configured device, such as the example computing device 102 of FIG. 1 that makes use of a touch visualizer module 120 and/or a client application module 108.

Figure 4:
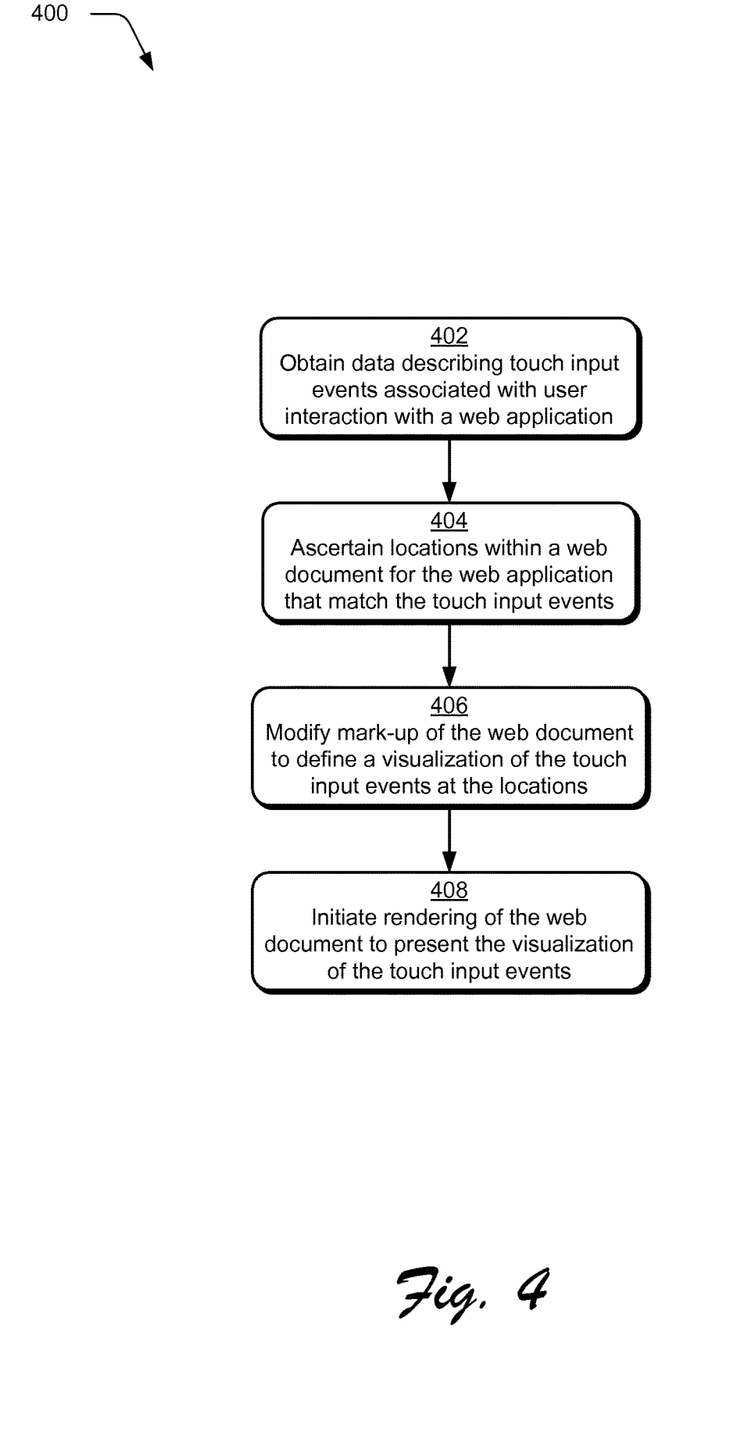
FIG. 4 is a flow diagram depicting an example procedure in accordance with one or more implementations.

FIG. 4 depicts an example procedure 400 in which touch input visualizations are implemented to represent user interaction with a web application. Data is obtained that describes touch input events associated with user interaction with a web application (block 402) and locations within a web document for the web application that match the touch input events are ascertained (block 404).

For example, a touch visualizer module 120 associated with a web application 118 may register to receive or otherwise capture touch input events supplied by a device.

In one approach, a touch controller or operating system may be configured to communicate touch input events to a client application module 108. Accordingly, a touch visualizer module 120 for a web application executed via the client application module 108 may operate to obtain and process the supplied data regarding touch input events in the manner previously described. The data includes information sufficient to determine at least locations of touch input, as well as other characteristics that may be used to generate and select visualizations. As mentioned, the touch visualizer module 120 may be configured to handle raw and/or pre-processed data regarding touch input events.

Mark-up of the web document is modified to define visualizations of the touch input events at the locations (block 406) and rendering of the web document is initiated to present the visualization of the touch input events at the locations (block 408). Modifications to define visualizations may occur in any suitable way as discussed in relation to the preceding figures. Touch visualizations 124 may be pre-selected indicators that are applied by default, such as a circular indicator, and/or may be selected on demand for each touch input event based on particular characteristics and contextual information derived from the data describing the touch input events. Generally, script sufficient to cause output of the visualizations at the ascertained locations may be injected into or otherwise added to mark-up of the web document that is currently presented. Then, when the application or browser refreshes the web document, the appropriate visualizations are presented within the web document at the ascertained locations.

Figure 5:
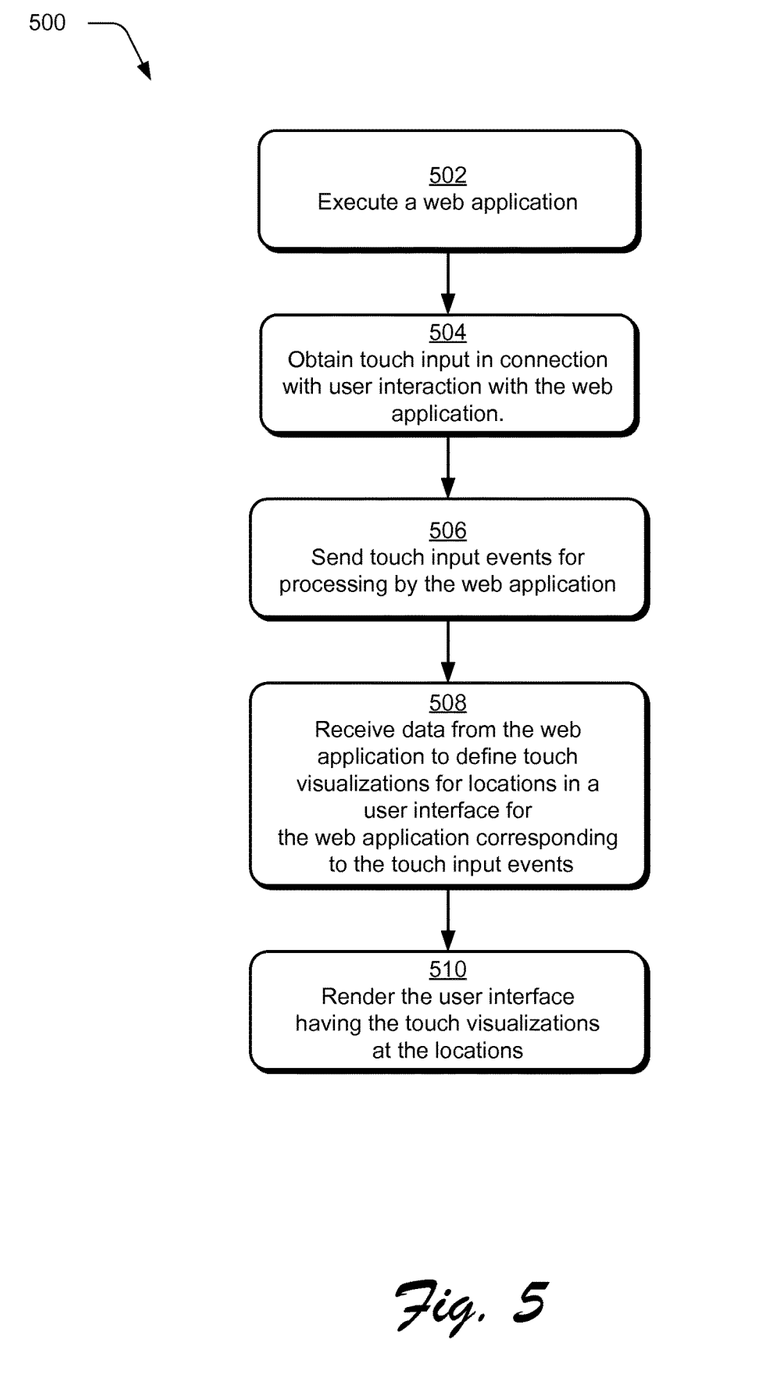
FIG. 5 is another flow diagram depicting an example procedure in accordance with one or more implementations.

FIG. 5 depicts an example procedure 500 in which a client application module (e.g., a browser) operates to output touch visualizations generated in connection with a web application. A web application is executed (block 502). For instance, a computing device 102 may access and execute a web application 118 from a service provider 112 over a network 114 using a client application module 108 as previously described.

Touch input is obtained in connection with user interaction with the web application (block 504) and touch input events are sent for processing by the web application (block 506). In particular, touch input events may be communicated to a touch visualizer module 120 or corresponding functionality for touch visualization implemented by the web application. In general, the web application 118 is a script-based application that runs via a client application module 108 that is executed via a processing system 104 of a computing device 102. Likewise, the functionality to implement touch visualizations may be configured as script that is included with or associated with the web application 118 and is run on the client-side. Touch input events that are provided to the client application module 108 (by a controller and/or operating system) may be passed along to the web application 118 for handling. Then, the touch visualizer module 120 is invoked to process the data to produce visualizations in the manner previously described. For instance, touch input events may be processed by way of the touch visualizer module 120 or other script that is executed by a script engine associated with a browser or other client application of a computing device 102.

Data is received from the web application to define touch visualizations for locations in a user interface for the web application corresponding to the touch inputs (block 508) and the user interface is rendered having the touch visualizations at the locations (block 510). Here, the client application module 108 may obtain a page/document that is modified to include touch visualizations 124 by the web application 118 and/or the touch visualizer module 120 associated with the web application. The client application module 108 may then render the page/document within a user interface 122 for the web application. The rendered page/document is configured to display the touch visualizations at locations corresponding to the touch input that is obtained.

Having described example procedures in accordance with one or more implementations, consider now an example system and device that can be utilized to implement the various techniques described herein.

Example System and Device

Figure 6:
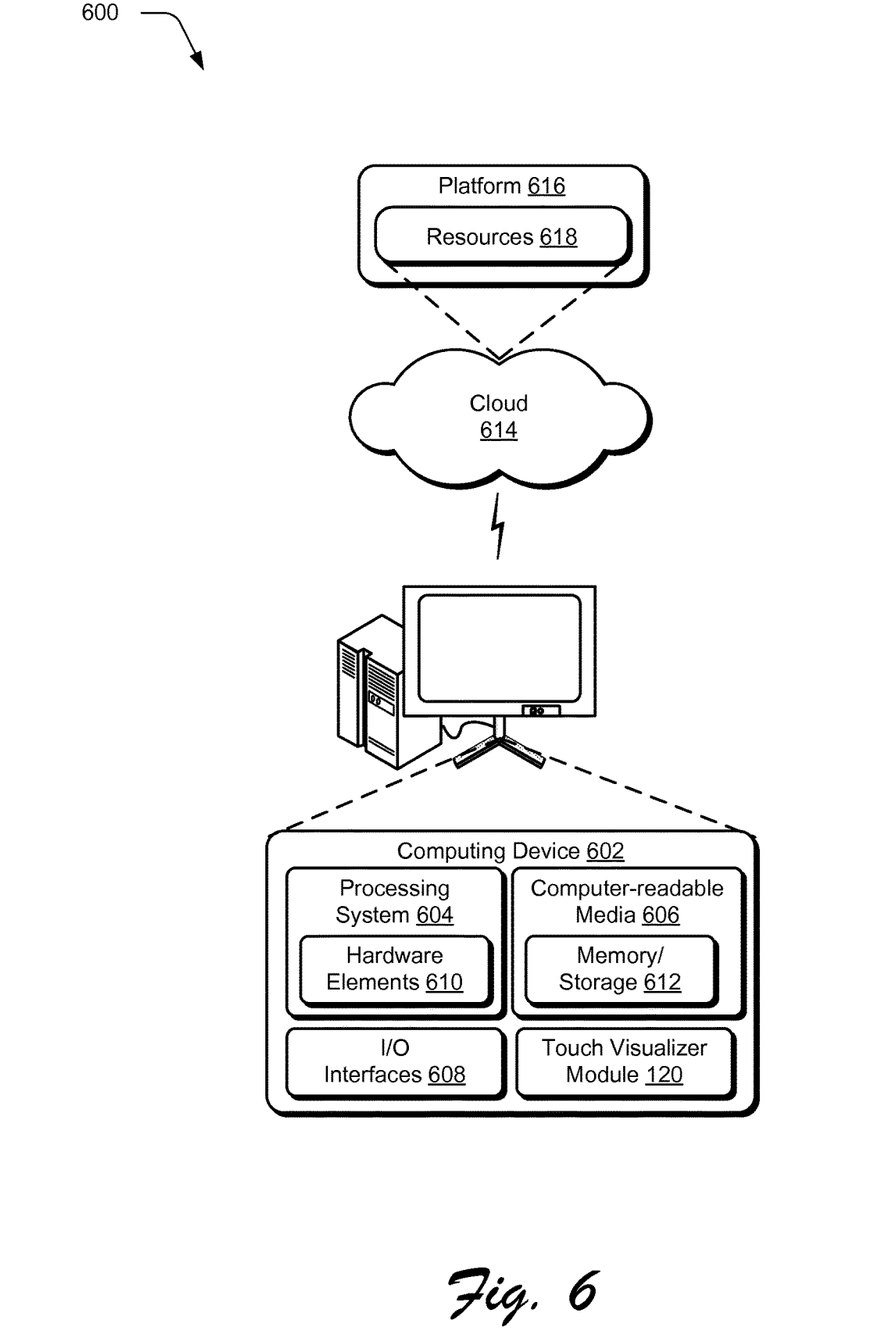
FIG. 6 illustrates an example system including various components of an example device that can be employed for one or more implementations of touch input visualizations described herein.

FIG. 6 illustrates an example system generally at 600 that includes an example computing device 602 that is representative of one or more computing systems and/or devices that may implement the various techniques described herein. This is illustrated through inclusion of the touch visualizer module 120, which operates as described above. The computing device 602 may be, for example, a server of a service provider, a device associated with a client (e.g., a client device), an on-chip system, and/or any other suitable computing device or computing system.

The example computing device 602 is illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a touch capable computing device, the method comprising:
connecting, using the touch capable computing device, to an interactive screen-sharing session with at least one other device via an external network, wherein the screen-sharing session permits a user interface of a web application executing on the touch capable computing device to be shared with the at least one other device, wherein the web application is configured to facilitate user interactions, by way of the user interface, with services and content provided by a service provider;
using a touch visualizer module to process a touch input event received by the user interface of the web application, the touch input event associated with a user interaction with at least one of the services or content provided by the service provider, wherein processing the touch input event causes display, on the touch capable computing device, of a touch visualization corresponding to the touch input event, wherein to process the touch input event further comprises using at least input context data representative of a context of the user interface in which the touch input event is provided to select the touch visualization; and
invoking a collaboration module to share a display of the user interface having the touch visualization that is displayed, on the touch capable computing device, with the at least one other device.

2. A method as described in claim 1, wherein the web application is accessed over a network from the service provider.

3. A method as described in claim 1, wherein the web application is executed via a browser at the touch capable computing device.

4. A method as described in claim 1, wherein the web application includes script defining the touch visualizer module.

5. A method as described in claim 1, wherein the touch visualizer module is configured as a handler for touch input events and is configured to receive touch input events from a touch controller, and wherein using the touch visualizer module further comprises selecting the touch visualization based upon characteristics ascertained from the touch input event received from the touch controller.

6. A method as described in claim 5, wherein the characteristics include one or more of a type of touch, pressure data, input durations, directional information, or a predetermined gesture.

7. A method as described in claim 5, wherein the selecting comprises:
referencing a visualizations library to match characteristics of the touch input event to touch visualizations contained in the visualizations library; and
retrieving definitions of touch visualizations that are determined to match the characteristics based on the referencing.

8. A method as described in claim 1 wherein using the touch visualizer module further comprises:
analyzing the touch input event to ascertain characteristics of touch input corresponding to the touch input event, including ascertaining at least locations associated with the touch input;
modifying mark-up of a web document associated with the web application to define the touch visualization to visually represent the touch input at the locations to demonstrate the received touch input; wherein the modifying comprises injecting positioning elements in the mark-up of the web document to define the touch visualization; and
wherein the invoking the collaboration module comprises outputting the web document as modified to the at least one other device to enable the at least one other device to render the web document as modified.

9. A method as described in claim 1, wherein the web application comprises a web-based publishing tool that facilitates creation and editing of web content.

10. A method as described in claim 1, wherein the web application is written using a dynamic scripting language that is operable to execute the web application via a runtime environment supported by the touch capable computing device.

11. One or more computer-readable storage media comprising instructions that are stored thereon that, responsive to execution by a touch capable computing device, cause the touch capable computing device to perform operations including:
connecting to an interactive screen-sharing session with at least one other device via an external network, wherein the screen-sharing session permits a user interface of a web application executing on the touch capable computing device to be shared with the at least one other device, wherein the web application is configured to facilitate user interactions, by way of the user interface, with services and content provided by a service provider;
obtaining, via a touchscreen of the touch capable computing device and during a touch based interaction, touch input corresponding to interaction with the web application and input context data, the touch input comprising commands or information input into the web application, the input context data representative of a context of the user interface of the web application in which the touch input is provided;
sending touch input events corresponding to the touch input and the input context data for processing by the web application;
receiving data from the web application to define touch visualizations that visually represent the touch input for locations within the user interface for the web application to demonstrate the touch input used to input commands or information into the web application;
rendering the user interface, on the touch capable computing device, for the web application to display the touch visualizations at the locations including displaying indicators to show positions and movement of the touch input; and
sharing, with the at least one other device via the screen sharing session, the touch visualizations to enable the at least one other device to display representations of the touch input into the web application by displaying the touch visualizations on the at least one other computing device.

12. One or more computer-readable storage media as described in claim 11, wherein the touch visualizations include different visualizations for different types of touch input.

13. One or more computer-readable storage media as described in claim 11, wherein at least one of the touch visualizations comprises a circular indicator to represent a touch input point within the user interface.

14. One or more computer-readable storage media as described in claim 11, wherein the web application is executed by a browser.

15. One or more computer-readable storage media as described in claim 11, wherein the data to define the touch visualizations that is received comprises a web page for the web application that is modified to include elements to implement the touch visualizations at the locations, the touch visualizations selected by the web application based upon characteristics of the touch input indicated by the touch input events that are sent for processing by the web application.

16. One or more computer-readable storage media as described in claim 11, further comprising:
communicating with a collaboration module of the touch capable computing device to share the rendered user interface including the touch visualizations for output by the at least one other device.

17. A touch capable computing device comprising:
a processing system; and
one or more computer readable media storing instructions executable via the processing system to perform operations to implement touch input visualizations in connection with a web application, the operations comprising:
connecting to an interactive screen-sharing session with at least one other device via an external network, wherein the screen-sharing session permits a user interface of a web application executing on the touch capable computing device to be shared with the at least one other device, wherein the web application is configured to facilitate user interactions, by way of the user interface, with services and content provided by a service provider;
obtaining touch input, via a touchscreen of the touch capable computing device and during the touch based interaction, corresponding to interaction with the web application, the interaction comprising commands or information input into the user interface of the web application;
obtaining input context data representative of a context of the user interface of the web application in which the touch input is provided;
invoking a touch visualizer module associated the web application to produce, based at least in part on the input context data, touch visualizations that visually represent the touch input to demonstrate the touch input used to input the commands or information;
displaying, on the touch capable computing device, the user interface having the touch visualizations; and
sharing, via the screen-sharing session, the user interface having the touch visualizations with the at least one other device to enable the at least one other device to display a representation of the interaction with the web application by displaying the user interface having the touch visualizations.

18. The touch capable computing device as described in claim 17, wherein sharing the touch visualizations comprises:
modifying mark-up of at least one web document associated with the web application;
injecting positioning elements defining the touch visualizations into mark-up of the at least one web document effective to generate modified mark-up with the positioning elements; and
sharing the modified mark-up with the positioning elements via the screen-sharing session.

19. The touch capable computing device as described in claim 18 further configured to perform operations comprising:
producing the touch visualizations by:
analyzing touch input events associated with the touch input to ascertain characteristics of the touch input, the analyzing based, at least in part, on the input context data;
referencing a visualizations library to match the characteristics of the touch input to touch visualizations contained in the visualizations library; and
based on the referencing, retrieving definitions of touch visualizations from the visualizations library that are determined to match the characteristics for injection into the at least one web document.

20. The touch capable computing device as described in claim 19 wherein the displaying comprises:
rendering, via a browser, the at least one web document including the touch visualizations for display by the touch capable computing device in the user interface for the web application; and
invoking a collaboration module to replicate the user interface for the web application including the touch visualizations for display at the at least one other device.

* * * * *